United States Patent [19]

Sky

[11] Patent Number: 5,035,913

[45] Date of Patent: Jul. 30, 1991

[54] PROCESS OF MAKING MICROWAVABLE OATMEAL COMPOSITION

[75] Inventor: Phillip Sky, Altoona, Pa.

[73] Assignee: To Market, Two Markets, Inc., Altoona, Pa.

[21] Appl. No.: 411,040

[22] Filed: Sep. 22, 1989

[51] Int. Cl.$^5$ ................................................ A23L 3/00
[52] U.S. Cl. .................................... 426/619; 426/243; 426/462; 426/620; 426/621
[58] Field of Search ............... 426/462, 463, 243, 464, 426/518, 618, 621, 619, 620; 241/11

[56] References Cited

U.S. PATENT DOCUMENTS

| | | | |
|---|---|---|---|
| 2,466,260 | 4/1949 | Musher | 241/11 |
| 2,864,702 | 12/1958 | Murray et al. | 426/619 |
| 3,113,868 | 12/1963 | Lee | 426/619 |
| 3,520,695 | 7/1970 | Hanser et al. | 426/619 |
| 3,640,728 | 2/1972 | Ronai et al. | 426/619 |
| 3,704,134 | 11/1972 | Ronai et al. | 426/619 |
| 3,887,714 | 6/1975 | Kelly et al. | 426/619 |
| 4,413,018 | 11/1983 | Webster | 426/462 |
| 4,497,840 | 2/1985 | Gould et al. | 426/463 |
| 4,874,624 | 10/1989 | Conroy et al. | 426/618 |

FOREIGN PATENT DOCUMENTS 946679  5/1974  Canada ................................ 426/619

Primary Examiner—Donald E. Czaja
Assistant Examiner—Mary S. Mims
Attorney, Agent, or Firm—Millen, White & Zelano

[57] ABSTRACT

The invention comprises a process for preparing oatmeal, which process comprises soaking steel cut oats and oat bran for a period of time sufficient to hydrate the oats, mixing rolled oats into the hydrated oat fraction, cooking the resultant mixture for a period of time sufficient to produce a flavorful food product, and optionally aseptically packaging the resulting product. The invention also comprises a process for preparing an oatmeal composition, which process comprises cooking steel cut oats in a manner so that the material is hydrated, adding rolled oats after a cooking time such that cooking of steel cut oats is substantially complete, adding optionally hydrated oat bran either before or after addition of the rolled oats, cooking the entire mixture for a time sufficient to render the product edible and packaging the product. The packaging steps in this aspect of the invention may comprise adding an acidic modifier to the cookable oat mixture, filling containers with the cooked oat mixture, inverting the filled containers allowing hot air to rise through the containers, and cooling the oatmeal. Alternatively, the packaging steps may comprise transferring the product to containers and cooling the product and container to a temperature sufficiently low so as to maintain product freshness and to retard spoilage.

19 Claims, No Drawings

PROCESS OF MAKING MICROWAVABLE OATMEAL COMPOSITION

FIELD OF THE INVENTION

The invention relates to an oatmeal food product that is optionally packaged aseptically and can be heated with microwave cooking and a process of making same.

BACKGROUND OF THE INVENTION

Oatmeal compositions have been known for a long period of time. More recently, oatmeal food products have become available in prepackaged forms. Usually these products are in a dry form which need water for cooking. Packaging of oatmeal in water-containing form so that nothing need be added before consumer preparation has not been used due to the adverse effects such processing has on the flavor and texture of the resulting oatmeal product. Packaging oatmeal preparations with water can result in the final product in oat particles that have degraded to a form of thick paste which lacks texture.

It would be desirable to have a complete oatmeal food product that could be prepared without the addition of water or other ingredients, and which may be stored in prepackaged form for long periods of time.

SUMMARY OF THE INVENTION

It is an object of the invention to provide an optionally aseptically prepared oatmeal based food composition that retains a pleasing texture.

It is another object of the invention to provide processes for optionally aseptically preparing an oatmeal based food composition that retains a pleasing texture.

In accordance with these and other objects which will become apparent from the description below, one such process comprises:

soaking steel cut oats and oat bran for a period of time sufficient to hydrate said steel cut oats and said oat bran and form a hydrated oat mixture;

adding rolled oats as a dry feed to the hydrated oat mixture to form a cookable oat mixture;

heating the cookable oat mixture for a period of time sufficient to cook the cookable oat mixture; and optionally aseptically packaging the cooked oat mixture.

Alternatively, the preparation may be carried out in a retort apparatus, e.g., an open kettle, with additional cooking taking place after filling but before sealing of the containers. In the retort preparation, water, steel-out oats, oat bran and flavorings are combined, heated to a temperature sufficient to effect cooking, rolled oats are added, and the entire mixture is simmered for a time sufficient to allow particulates to settle. The mixture is then placed in containers and cooking is completed. The containers are then sealed and may be heated to sanitize the product.

The process according to that invention results in a pleasing oatmeal food that can be used economically with or without additional flavoring agents by domestic and commercial food preparers.

The present invention is further directed to additional methods of packaging of an oatmeal composition with water so that pleasing taste and texture are retained. These processes according to the present invention comprise:

cooking steel cut oats and oat bran in a manner so that the material is hydrated and substantially cooked, adding rolled oats at a point in the process where cooking of the steel cut oats and oat bran is substantially complete, cooking the entire mixture for a time sufficient to render the product edible, and packaging the product and its associated water by a "hot-fill" or a "fresh-pack" process.

In the "fresh pack" process, the product is placed in containers designed for shipment and sale of the product to purchasers, e.g., large buckets or individual packets or bowls. After packing with the freshly cooked, hot product, the product and container are chilled to a temperature sufficient to maintain freshness and are maintained at temperature until use.

In the "hot fill" process, the product is packed hot into containers, inverted so hot air present rises to the top, and the containers are sealed, resulting in a sterile package.

DETAILED DESCRIPTION OF THE INVENTION

Steel cut oats are well known in the industry as oat particulates produced by cutting whole groats from clean, sound oats without rolling. A preferred form of steel cut oat is commercially known as a "table steel cut oat groat". A desirable granulation size is about 8% by weight maximum over a U.S. #7 sieve and 25% maximum through a U.S. #12 sieve. Steel cut oats are used in the invention to add texture to the resulting food product.

Oat bran is water soluble and should be handled in such a manner as to avoid clumping. Mild agitation is preferred to break up any clumps that may have formed yet avoid harm to the added oat bran. It is not desirable to have a high rate of agitation as the oat bran will break up and solubilize to the detriment of the resulting flavor.

Any coarseness or granulation of oat bran can be used depending on the taste and texture desired in the final product. A preferred granulation has 10% maximum on U.S. #10, 55-75% on U.S. #20, 10-30% on U.S. #30, and 10% maximum in the pan at an overall density of about 30-32 lb/cu.ft.

Rolled oats come in a variety of commercially available thicknesses. All of these thicknesses are useful in the process according to the invention. Rolled oats are available as "thick table rolled", "regular rolled", and "quick cooking oats" in order of decreasing thickness. The thick rolled oats are preferred as they retain their texture and overall flavorful contribution while being less susceptible to processing damage. A desirable granulation of thick table rolled oats is about 80% minimum on a U.S. #8 sieve and 10% maximum passing through a U.S. #20 sieve.

In the method for optionally "aseptically" processing oats and oat fractions into a flavorful oatmeal composition, the first step is to hydrate steel cut oats, for example, by soaking in water for up to about 45 minutes at about 65-85° F. Steel cut oats are well known in the industry as oat particulates produced by cutting whole groats from clean, sound oats without rolling. A preferred form of steel cut oat is commercially known as a "table steel cut oat groat". A desirable granulation size is about 8% by weight maximum over a U.S. #7 sieve and 25% maximum through a U.S. #12 sieve. Steel cut oats are used in the invention to add texture to the resulting food product.

To the soaking steel cut oats can be added an optional flavor fraction. A wide variety of flavors agents may be present but preferably comprise cinnamon, honey or other sweetening material, salt, and vanilla in proportions to taste. Cinnamon is desirably present in virtually any physical form at a weight ratio with respect to the overall composition of about 0.2 to 0.6%, while honey is desirably added in a weight ratio of about 4 to 12%. Salt can be used in a weight ratio of up to about 0.26% depending on flavor and dietary considerations for the product. Vanilla can be added in a weight ratio of 0.4 to 1.2%, depending on the vanilla flavor concentration (fold).

It should be understood that the flavor fraction may contain other ingredients or use widely different proportions for the listed components. Taste, style, and economic factors will tend to guide the formulation of the flavor fraction if added to the product at all.

Oat bran is preferably added to the hydrating steel cut oats after the cut oats have been soaking for about 7 to 12 minutes. Oat bran is water soluble and should be added in such a manner as to avoid clumping. Mild agitation is preferred to break up any clumps that may have formed yet avoid harm to the added oat bran. It is not desirable to have a high rate of agitation as the oat bran will break up and solubilize to the detriment of the resulting flavor.

Any coarseness or granulation of oat bran can be used depending on the taste and texture desired in the final product. A preferred granulation has 10% maximum on U.S. #10, 55-75% on U.S. #20, 10-30% on U.S. #30, and 10% maximum in the pan at an overall density of about 30-32 lb/cu. ft.

When the steel cut oats and oat bran have been mixed and soaked, the cut oat/bran mixture is desirably transferred to a holding reservoir. This transfer step may be through a series of pipes or other handling apparatus. The rate and amount of shear that is induced is desirably minimized to preserve the texture of the steel cut oats and the oat bran while assuring adequate mixing to avoid clumping.

Rolled oats (otherwise known as oat flakes) can be added at any point in the process before cooking the mixture. Desirably, they are added to the cut oat/bran mixture in the holding reservoir. The rolled oats are even more preferably added before the cut oat/bran mix is passed to the reservoir to minimize shear forces on the flakes and thereby preserve their texture.

The oat mixture containing cut oats, bran, and flakes is then heated to a temperature of about 250° to 325° F. for a time sufficient to cook the oatmeal fractions, e.g. for 15 seconds to about 2 minutes, depending on the temperature. It is preferable to maintain aseptic conditions during the cooking and avoid the introduction of any microorganisms or bacteria which could adversely affect the food product. For that reason, conventional aseptic processing equipment such as closed kettles and heating tubes are desirably used. This aseptic product has a shelf like under refrigeration at 40°-50° F. of about 4-6 months.

If the storage conditions of the aseptically packaged product are likely to be at temperatures above 75° F. for an extended period of time, it may be desirable to add a small quantity of preservative to ensure the safety of the food composition. Among the well known, suitable preservatives are potassium sorbate and sodium benzoate.

Further, where aseptic packaging conditions are not used, conventional preservatives may be added according to conventional protocols as is customary in the industry to preserve product freshness.

In the retort preparation, the steel cut oats and oat bran mixture is heated to a temperature of about 150° F. to about 220° F., preferably at least 180° F. The rolled oats are then added, and the entire mixture is simmered for about 2 to 5 minutes. Preferably, the mixture is simmered for about 3 minutes. The mixture is subsequently placed into containers such as bowls or pouches designed as retail or wholesale packaging for the product and additionally cooked for a time sufficient to produce an edible composition.

Cooking time in the containers is affected by container size and thickness, with larger and/or denser containers requiring longer cooking times. Preferred cooking time in containers is about 13 minutes to 1 hour and 25 minutes. Preferred cooking temperature is at least about 250° F., more preferably 250° to about 310° F. Further, rotation of the container may be performed, which rotation further shortens cooking time. Rotation of the containers of up to 15 rpm may be used.

Flavorings may be added, as discussed above. In addition, raisins may be included in the composition at any point in the preparation. Where raisins are to be added, they are preferably added in the final stages of the procedure.

When cooking is complete, the containers are sealed and may be heated to sanitize the contents. Alternatively, conventional preservatives may be added.

In both the optional aseptic and retort processes above, it is desirable to add the rolled oats at a point in the preparation so that their processing is minimized, in order to avoid production of a paste-like product. Although the specific order of the steps discussed above represents the preferred methods of practicing the invention, other variations which would delay processing of the rolled oats are also intended to be encompassed within the invention. For example, the steel-cut oats may be cooked separately, combined with previously hydrated oat bran, and then cooked with rolled oats for a short time.

In the "hot fill" and "fresh pack" processes, when the steel cut oats and oat bran have been mixed and soaked, the cut oat/bran mixture may be transferred to a holding reservoir or cooking apparatus, e.g., an open kettle. This transfer step may be through a series of pipes or other handling apparatus. The rate and amount of shear that is induced is desirably minimized to preserve the texture of the steel cut oats and the oat bran while assuring adequate mixing to avoid clumping.

Rolled oats (otherwise known as oat flakes) are added to the cut oat/bran mixture in the cooking apparatus. The rolled oats are even more preferably added before the cut oat/bran mix is passed to the reservoir, where a reservoir is used, to minimize shear forces on the flakes and thereby preserve their texture. In both the hot-fill and fresh pack processes, it is desirable to add the rolled oats at a point in the preparation so that their processing is minimized, in order to avoid production of a paste-like product. Although the specific order of the processing steps discussed below represents the preferred method of practicing the invention, other variations which would delay processing of the rolled oats are also intended to be encompassed within the invention. For example, the steel-cut oats may be first hydrated, combined with the oat bran, and then cooked, with subsequent addition of rolled oats and optionally further cooking for a short time.

In a preferred embodiment of the fresh pack process, the steel cut oats and water are cooked at a rolling boil for about 5 to 15 minutes, preferably about 10 minutes, at about 15-18 psi. The rolled oats are then added and the mixture is cooked for an additional approximately 3 to 8 minutes. The oat bran is then added and cooking is continued for up to about 3 minutes. Preferably, the bran is previously hydrated to shorten cooking time, e.g., soaked for about 1 to 5 minutes in hot water. The mixture is then transferred to containers, e.g., through a pump system and chilled to about 40° to 85° F., preferably to approximately 50° to 80° F. The container and oatmeal may be cooled using a variety of conventional container cooling techniques, e.g., contact with cold water or gas, refrigeration, etc.

Depending on the desired end use of the product, the containers may be large pails for food service applications or retail packs for consumer use. Where such packaging is not sterile, preservatives are added, generally to the cooking apparatus during processing. Among the well known, suitable preservatives are potassium sorbate and sodium benzoate. These and other conventional preservatives may be added according to conventional protocols as is customary in the industry to preserve product freshness.

In a preferred embodiment of the hot fill technique, the oatmeal composition can be acidified with suitable pH modifier using an open kettle for the cooking. Suitable pH modifiers include glucono delta lactone, apple butter, apple pectin, any naturally acidic flavorings, and combinations thereof. The resulting product can then be filled into containers at an elevated temperature, e.g., about 140° to 160° F., sealed with a removable plastic film, and inverted. Preferably, the container is hot filled with about 80-98 vol. % oatmeal with the remainder being air that is naturally drawn into the container during the filling step and becomes heated to the oatmeal temperature. An inversion step permits hot air within the container to rise through the oatmeal composition and kill any bacteria that might have been introduced as a result of the open kettle cooking. The result of the inversion is a sterile package.

The hot fill product according to the invention has a refrigerated shelf life of approximately 4-6 months for a 24 ounce container. The product can be opened and heated on a conventional stove or in a microwave oven set at high for about 45 to 90 seconds depending on the oven power. Additional flavoring agents may be added to the cooked product if desired.

In either process, an optional flavor fraction may be added during processing, preferably to the steel cut oats. A wide variety of flavors agents may be present but preferably comprise cinnamon, honey or other sweetening material, salt, and vanilla in proportions to taste. Cinnamon is desirably present in virtually any physical form at a weight ratio with respect to the overall composition of about 0.2 to 0.6%, while honey is desirably added in a weight ratio of about 4 to 12%. Salt can be used in a weight ratio of up to about 0.26% depending on flavor and dietary considerations for the product. Vanilla can be added in a weight ratio of 0.4 to 1.2%, depending on the vanilla flavor concentration (fold).

It should be understood that the flavor fraction may contain other ingredients or use widely different proportions for the listed components. Taste, style, and economic factors will tend to guide the formulation of the flavor fraction if added to the product at all. In addition, raisins may be included in the composition at any point in the preparation. Where raisins are to be added, they are preferably added in the final stages of the procedure.

Without further elaboration, it is believed that one skilled in the art can, using the preceding description, utilize the present invention to its fullest extent. The following preferred specific embodiments are, therefore, to be construed as merely illustrative, and not limitative, of the remainder of the disclosure in any way whatsoever.

The entire texts of all applications, patents and publications, if any, cited above and below, are hereby incorporated by reference.

EXAMPLE 1

TABLE 1

| Ingredient | Wt. % |
| --- | --- |
| Water | 73.9 |
| Steel cut oat groats | 8.0 |
| Thick rolled oats | 8.0 |
| Wildflower honey | 8.0 |
| Oat Bran | 0.76 |
| McCormick Vanilla Extract (v-401) | 0.7 |
| Ground cinnamon | 0.4 |
| Salt | 0.24 |

To prepare the oatmeal composition as shown in Table 1, the following process was used:

In a kettle, warm water at 70° F. was mixed with steel cut oats and soaked for a total time of 30 minutes. During the soaking, a flavor fraction of water, honey, vanilla, salt, and cinnamon was dissolved in the water. Oat bran was added to the soaking cut oat/flavor mixture with mild agitation.

Rolled oats were then added as a dry feed at the rate of 2.1 lbs/min. When mixed, the oatmeal composition was passed through a cooking tube of 130 inches long at 276° F. at the rate of 3 gallons per minute. The cooked mixture was filled into six ounce plastic cups at 110° to 120° F. and capped.

EXAMPLE 2

Water was brought to a rolling boil, and a honey container was placed into the hot water bath and set aside to loosen up. Two gallons of water was removed to hydrate the oat bran, blended with the bran until smooth and until no lumps existed, set aside and covered with a plastic bag to retain heat. Preservatives were added directly to the water in the kettle and stirred to dissolve. Salt, vanilla and cinnamon were added while stirring constantly.

Steel-cut oats were added, cooked for 10 minutes at an even, rolling boil throughout cooking (approximately 15-18 PSI or 210°-212° F.). At 10 minutes, rolled oats were added and cooked for an additional 6 minutes. At 16 minutes, the hydrated oat bran, honey (and raisins) were added and cooked for an additional 3 minutes.

Steam was shut off immediately and as quickly as possible the product was bucketed out into large pails, followed immediately by $CO_2$ chilling to 50°-85°. $CO_2$ time: Approximately 2 minutes 35 seconds.

EXAMPLE 3

TABLE 2

| Ingredients | Description | Quantity | Percentage of Ingredient |
|---|---|---|---|
| Water | Potable | 10509.5 | 77.23 |
| Oats | Conagra Steel Cut (Code 8273) | 1088.6 | 8.00 |
| Honey | Wild Flower (TM2) | 680.4 | 5.00 |
| Vanilla | Gold Medal-Borden | 81.6 | 0.60 |
| Salt | Non-Iodized | 21.8 | 0.16 |
| Cinnamon | McCormick (TM2) | 34.0 | 0.25 |
| Oat Bran | Mothers (Code 8L1J) | 103.4 | 0.76 |
| Oats | Conagra #3 Rolled (Code 8273) | 1086.6 | 8.00 |
| | | 13607.9 | 100.00 |

PROCEDURE

1. Combine all ingredients (except rolled oats) to maintain identity. Heat to 180° F.
2. Add rolled oats, simmer 3 minutes. Turn off heat.
3. Remove product from kettle.
4. Record yield 28 lbs. Correct to 100% yield 30 lbs.
5. Fill bowls and pouches to 8.0 ounces.

| Pouches | Bowls |
|---|---|
| Process Temperature - 250° F. | Process Temperature - 250° F. |
| Rotations/Minute - 9 RPM | Rotations/Minute - 0 |
| Processing Pressure - 30 psi | Processing Pressure - 30 psi |
| Total Cook Time - 13 minutes | Total Cook Time - 26 minutes |

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A process for preparing a complete oatmeal composition, said process comprising:
   cooking steel cut oats in a manner so that the material is hydrated;
   adding rolled oats after a cooking time such that cooking of the steel cut oats is substantially complete;
   adding optionally hydrated oat bran either before or after addition of the rolled oats;
   cooking the entire mixture for a time sufficient to render the product edible; and packaging the product by a process comprising:
   adding an acidic modifier to the cookable oat mixture;
   filling containers with the cooked oat mixture;
   inverting the filled container to allow hot air to rise through the container; and
   cooling the oatmeal.

2. A process for preparing a complete oatmeal composition, said process comprising:
   cooking steel cut oats in a manner so that the material is hydrated;
   adding rolled oats after a cooking time such that cooking of the steel cut oats is substantially complete;
   adding optionally hydrated oat bran either before or after addition of the rolled oats;
   cooking the entire mixture for a time sufficient to render the product edible; and packaging the product by a process comprising:
   transferring the product to containers and chilling the product and container to a temperature sufficiently low so as to maintain product freshness and retard spoilage.

3. A process according to claim 2, comprising cooking the steel cut oats for about 5 to 15 minutes at about 210° to 212° F., adding the rolled oats and continuing cooking for about 3 to 8 minutes, adding the oat bran, and cooking the entire mixture for up to 3 minutes.

4. A process according to claim 3, wherein the oat bran has been previously hydrated.

5. A process according to claim 1, further comprising adding a flavor fraction to the steel cut oats.

6. A process according to claim 1, further comprising minimizing shear forces on the cookable oat mixture during the heating step.

7. A process according to claim 1, comprising soaking a mixture of steel cut oats and oat bran in water for a period of time sufficient to hydrate the mixture, adding rolled oats to the hydrated mixture to form a cookable oat mixture, heating the cookable mixture for a period of time sufficient to cook the mixture and packaging the cooked mixture.

8. A process according to claim 1, comprising heating the steel cut oats for a time sufficient to substantially cook the oats, adding the rolled oats and continuing cooking for a time sufficient to partially cook the rolled oats, adding the oat bran, cooking the entire mixture for a time sufficient to render the mixture edible, and packaging the mixture.

9. A process for preparing a complete oatmeal composition, said process comprising:
   soaking steel cut oats and oat bran in water for a period of time sufficient to hydrate said steel cut oats and said oat bran and form a hydrated oat mixture;
   adding rolled oats as a dry feed to the hydrated oat mixture to form a cookable oat mixture;
   heating the cookable oat mixture for a period of time sufficient to cook the cookable oat mixture; and optionally,
   packaging the cooked oat mixture under aseptic conditions.

10. A process according to claim 9, further comprising adding a flavor fraction to the soaking steel cut oats.

11. A process according to claim 9, further comprising minimizing shear forces on the cookable oat mixture during the heating step.

12. A process according to claim 9, wherein the packaging step comprises:
   adding an acidic modifier to the cookable oat mixture;
   filling containers with the cooked oat mixture and hot air at a temperature within a range of about 140° F. to about 160° F.;

13. A process for the production of an oatmeal composition, comprising cooking hydrated, steel-cut oats and oat bran and subsequently adding rolled oats.

14. A process according to claim 13, further comprising cooking the mixture of steel-cut oats, oat bran and rolled oats for a time sufficient to produce an edible oatmeal mixture.

15. A process for the preparation of a complete oatmeal composition, said process comprising:
   heating steel cut oats and oat bran to a temperature sufficient to hydrate said steel cut oats and said oat bran and form a hydrated oat mixture;
   adding rolled oats to the hydrated oat mixture to form a cookable oat mixture;
   cooking the mixture for a time sufficient for particulate matter to settle;
   placing the mixture into a container;
   cooking the mixture at a temperature and for a time sufficient to produce an edible mixture; and
   sealing the container.

16. A process according to claim 15, wherein the steel cut oats and oat bran are heated to hydration in an open kettle.

17. A process according to claim 15, wherein subsequent to sealing the container is heated to sanitize the edible mixture.

18. A process according to claim 15, wherein the steel cut oats and oat bran are heated to hydration at a temperature of about 150° to 22° F., the cookable mixture is simmered for about 2 to 5 minutes, and subsequent to placement in the container the mixture is cooked for about 13 minutes to 1 hour, 25 minutes at a temperature of at least about 250° F.

19. A process according to claim 15, wherein raisins are added to the oat mixture.

* * * * *